US011986832B2

(12) United States Patent
Schell

(10) Patent No.: US 11,986,832 B2
(45) Date of Patent: May 21, 2024

(54) COMMINUTING APPARATUS COMPRISING A FEED DEVICE WITH AN ELECTROMOTIVE DRIVE DEVICE

(71) Applicant: VECOPLAN AG, Bad Marienberg (DE)

(72) Inventor: André Schell, Kirkburg (DE)

(73) Assignee: VECOPLAN AG, Bad Marienberg (DE)

( * ) Notice: Subject to any disclaimer, the term of this patent is extended or adjusted under 35 U.S.C. 154(b) by 92 days.

(21) Appl. No.: 17/303,341

(22) Filed: May 27, 2021

(65) Prior Publication Data

US 2022/0023871 A1 Jan. 27, 2022

(30) Foreign Application Priority Data

May 29, 2020 (DE) .................... 10 2020 114 510.1

(51) Int. Cl.

*B02C 18/00* (2006.01)
*B02C 18/14* (2006.01)
*B02C 18/22* (2006.01)
*B02C 18/16* (2006.01)

(52) U.S. Cl.

CPC ........ *B02C 18/2233* (2013.01); *B02C 18/145* (2013.01); *B02C 2018/164* (2013.01)

(58) Field of Classification Search

CPC .............. B02C 18/2233; B02C 18/145; B02C 2018/164

See application file for complete search history.

(56) References Cited

U.S. PATENT DOCUMENTS

| | | | | | |
|---|---|---|---|---|---|
| 1,608,183 | A * | 11/1926 | Quante | A01F 29/02 | 241/222 |
| 2,918,224 | A * | 12/1959 | Hornberger | B27L 11/06 | 241/38 |
| 3,160,351 | A * | 12/1964 | Shelton, Jr. | B02C 13/286 | 241/34 |
| 4,394,984 | A * | 7/1983 | Hight | B02C 18/143 | 241/278.1 |

(Continued)

FOREIGN PATENT DOCUMENTS

| | | |
|---|---|---|
| DE | 9000349 | 5/1990 |
| EP | 3446786 | 2/2019 |

*Primary Examiner* — Faye Francis

(74) *Attorney, Agent, or Firm* — Grossman, Tucker, Perreault & Pfleger, PLLC

(57) ABSTRACT

A comminuting apparatus for comminuting comminution stock like recyclable material, waste and product residues, including a comminuting rotor mounted rotatably to a machine frame and having comminuting tools arranged thereon, a receiving region for receiving comminution stock and a feed device having a ram device which is moveable in the direction towards the comminuting rotor by a drive device and which is adapted for feeding comminution stock to the comminuting rotor. The comminuting apparatus is distinguished in that the drive device of the feed device has at least two spaced electric actuators which are controlled by a control device and which are connected at the drive output side by a transverse member, wherein the transverse member is operatively connected to the ram device by a resilient damping device.

20 Claims, 3 Drawing Sheets

(56) References Cited

U.S. PATENT DOCUMENTS

| | | | | | |
|---|---|---|---|---|---|
| 4,723,717 | A * | 2/1988 | Fagnant | B02C 18/142 241/293 |
| 5,150,843 | A * | 9/1992 | Miller | B02C 18/2233 241/73 |
| 5,344,088 | A * | 9/1994 | Page | B02C 4/10 241/282 |
| 5,417,375 | A * | 5/1995 | Peterson | B02C 23/02 241/101.76 |
| 5,509,613 | A * | 4/1996 | Page | B02C 18/2233 241/282 |
| 5,924,637 | A * | 7/1999 | Niederholtmeyer | B02C 18/14 241/DIG. 31 |
| 6,016,979 | A | 1/2000 | Squires et al. | |
| 6,305,623 | B1 * | 10/2001 | Sotsky | B02C 18/145 241/73 |
| 6,311,908 | B1 * | 11/2001 | Kajiyama | B02C 18/14 241/236 |
| 9,968,939 | B2 * | 5/2018 | Berglitsch | B02C 18/18 |
| 2007/0029418 | A1 * | 2/2007 | Jakobi | B09B 3/0075 241/242 |
| 2007/0164139 | A1 | 7/2007 | Lipowski et al. | |
| 2011/0252934 | A1 * | 10/2011 | van Gemert | B02C 18/2233 83/14 |
| 2013/0299318 | A1 | 11/2013 | Strautmann | |
| 2018/0214885 | A1 * | 8/2018 | Garin Rotondaro | B09B 3/20 |
| 2020/0179938 | A1 | 6/2020 | Pischon | |

* cited by examiner

COMMINUTING APPARATUS COMPRISING A FEED DEVICE WITH AN ELECTROMOTIVE DRIVE DEVICE

FIELD

The invention concerns a comminuting apparatus for comminuting comminution stock like recyclable material, waste and product residues, including a comminuting rotor mounted rotatably to a machine frame and having comminuting tools arranged thereon, a receiving region for receiving comminution stock and a feed device having a ram device which is moveable in the direction towards the comminuting rotor by means of a drive device and which is adapted for feeding comminution stock to the comminuting rotor.

BACKGROUND

Comminuting apparatuses of that kind are well-known in the art. In that case the feed devices used, which are also referred to as post-pressing devices, are usually constructed at the drive output side in the form of oil-hydraulic systems in order to generate the pressing pressures which are necessary depending on the respective design configuration on the comminution stock, with at the same time a compact structure for the drive of the feed device. Such conventional comminuting apparatuses with a hydraulic drive of the feed device are disclosed for a linearly moveable ram device for example in German Utility Model DE 90 003 49 U1 and for a rotatably mounted ram device in laid-open specification EP 3446786 A1.

A disadvantage of such hydraulic drive systems for the feed device of known comminuting apparatuses is on the one hand the presence of many hydraulic interfaces at pipe and line connections with the frequent leakages which are involved therewith in the course of operation of such systems. In that respect they are on the one hand maintenance-intensive by virtue of the necessary regular checking of the pressurized components while nonetheless being prone to failure. By virtue of the use of environmentally-damaging operating substances in such systems they further require regular exchange of the hydraulic hoses, in addition the level of efficiency of such drive systems is reduced.

SUMMARY

In that respect the object of the present invention is to provide a comminuting apparatus having a feed device, which at least partially overcomes the above-described disadvantages of conventional comminuting apparatuses.

The comminuting apparatus according to the invention is distinguished in that the drive device of the feed device has at least two electric actuators which are spaced, in particular parallel to the longitudinal direction of the comminuting rotor, and which are controlled by means of a control device and which are connected at the drive output side by means of a transverse member extending in particular parallel to the rotor, wherein the transverse member is operatively connected to the ram device by way of a resilient damping device, in particular for transmission of a force directed in the direction towards the comminuting rotor from the transverse member of the drive device to the ram device.

The comminuting apparatus according to the invention is based on the fundamental idea of providing for the drive device of the feed device a drive with continuous mechanical force transmission, from an electric motor. In that respect the drive of the feed device is adapted for temporarily acquiring energy by the arrangement of a resilient damping device, wherein the potential resilient energy can be delivered again for the movement of the ram device. In contrast to the oil-hydraulic systems of the feed device of conventional comminuting apparatuses it is possible with the comminuting apparatus according to the invention to provide a drive which is leakage-free in relation to the drive device of the feed device, with an improved level of efficiency, whereby in addition it is possible to dispense with the use of environmentally damaging operating substances and to considerably reduce the maintenance involvement. By virtue of the fact that a resilient damping device is connected for force transmission between the ram device and the drive device components of the actuators like electric motor and/or gear elements can be protected from an overload in the event of shock loadings in operation.

In general the term electric actuator is used to denote an electric motor-gear unit which depending on the respective design configuration can also have a plurality of successively connected gear and/or coupling elements. The expression “ram device” or ram is also referred to in the art as the “pusher device” or pusher and can generally mean a device which is adapted to exert a force on the comminution stock for moving same in the direction of the comminuting rotor. The above-specified receiving region for receiving comminution stock can also be referred to as the comminuting chamber. The term “transverse member of the drive device” can be used generally to mean a connecting element which couples the at least two actuators together at the drive output side. In the context of the invention the connecting element can be adapted to provide a positively locking, force-locking or material-bonded connection between the multiplicity of electric actuators. In particular in the case of a linearly moveably arranged and driven ram device it can be provided that the connecting element extends approximately parallel to the longitudinal direction of the rotor, wherein the at least two electric actuators can extend approximately perpendicularly to the longitudinal direction of the rotor and can be fixed to the machine frame of the comminuting apparatus in mutually spaced relationship in the longitudinal direction of the comminuting rotor. In that respect it can be provided that the at least two electric actuators linearly move the transverse member of the drive device approximately perpendicularly and synchronously relative to the axis of the comminuting rotor.

Advantageous developments of the invention and further features according to the invention are set forth in the general description hereinafter, the Figures, the specific description and the appendant claims.

It can be provided that the arrangement of the resilient damping device between the transverse member or the connecting element of the drive device and the ram device is of such a configuration that an operative connection is provided by the resilient damping device both upon a movement of the ram device in the direction towards the rotor and also in the direction away from the rotor. The term “operative connection” means generally a connection for the transmission of forces and/or torques. It can also be provided that the operative connection provided by the resilient damping device between the transverse member of the drive device and the ram device is implemented solely when driving or moving the ram device in the direction towards the rotor, but not in the movement of the ram device by driving away from the rotor by way of the transverse member, that is to say the operative connection afforded by the resilient damping device can be set to be direction-dependent.

For the transmission of forces or moments in the movement of the ram device away from the comminuting rotor in accordance with the invention there may be provided beside the resilient damping device a further coupling or connecting element which provides an operative connection between the transverse member of the drive device and the ram device, wherein the further coupling or connecting element affords an operative connection in respect of a movement of the ram device in said opposite direction (relative to the ram movement towards the comminuting rotor). Such a further coupling or connecting element disposed between the transverse member of the drive device and the ram device can be in particular a tie anchor device which is adapted to transmit solely the force for pulling the ram device back from the rotor, but at least over a predetermined relative displacement movement between the ram device and the transverse member of the drive device not to provide an operative connection for forward movement of the ram device in the direction towards the comminuting rotor.

It can be provided that the receiving or comminuting chamber can be delimited by portions of the ram device, in particular a ram plate region or a ram plate, or said portions of the ram device represent delimitation portions of the receiving region or comminuting chamber of the comminuting apparatus. The ram device can be arranged or positively guided moveably, in particular linearly moveably, on a floor portion delimiting the receiving region or the comminuting chamber, wherein the ram device can be supported by the floor portion for example by means of a roller support arrangement. For that purpose the ram device at its underside which is towards the floor portion can include for example a multiplicity of wheel elements or wheels which are adapted to roll on that floor portion.

Positive guidance of the ram device can be implemented for example in the arrangement involving a linear movement of the ram device in the direction towards the comminuting rotor by for example side portions of the machine frame of the comminuting apparatus, said side portions extending approximately perpendicularly to the longitudinal axis of the comminuting rotor and being in mutually spaced relationship, wherein inside surfaces of said side portions can preferably be spaced over a working width of the comminuting rotor and can delimit the receiving chamber. The ram device can be of an operative width which is substantially equal to the operative width of the comminuting rotor. In that respect the term operative width means the extent over which the rotor performs comminution of the comminution stock or the ram device can provide for a feed of the comminution stock in the direction of the comminuting rotor.

For coupling the transverse member of the drive device and the ram device it can be provided as described above that the transverse member, the resilient damping device and the ram device are so arranged relative to each other that the operative connection between the transverse member and the ram device, which is implemented by means of the resilient damping device, is afforded in a movement of the ram device in the direction towards the comminuting rotor and is canceled in a movement of the ram device in the opposite direction. Such a coupling between the transverse member of the drive device and the ram device can be desirable in particular in those configurations in which the resilient damping device has a differing behaviour in relation to pressure and tensile loadings. In particular in such a case it can be provided that the operative connection between the transverse member of the drive device and the ram device is provided in the movement of the transverse member in two opposite directions by different coupling devices, for example in a direction towards the rotor by means of a resilient damping device as already described hereinbefore and in the opposite direction by means of a rigid coupling which for example comes into operation as from the attainment of a predetermined spacing between the transverse member of the drive device of the feed device and the ram device and which in the event of a smaller spacing between the transverse member of the drive device and the ram device permits free mobility as between the ram device and the drive device.

For coupling the transverse member of the drive device to the ram device it can be provided that the latter has an associated coupling transverse member which is also referred to as a coupling plate and which in particular can extend parallel to the transverse member of the drive device, wherein the transverse member of the drive device can be coupled by way of the resilient damping device to the associated coupling transverse member of the ram device, in such a way that the resilient damping device is supported at both transverse members in at least one relative operative position of the two transverse members relative to each other. Such an operative position or operating situation can be for example one in which the ram device is moved by corresponding movement of the transverse member of the drive device in the direction towards the comminuting rotor. Such an operating situation can be distinguished in particular by virtue of the fact that energy is stored in the resilient damping device, which can be used in spite of the motor of the respective actuator being switched off, to exert a pressing pressure on the ram device or to use that energy in a subsequent operating situation in order to move the ram device in the direction towards the comminuting rotor. The above-described configuration of the feed device provides a higher level of flexibility in terms of actuation of the drive device of the feed device for optimizing the comminution operation in operation of the comminuting apparatus according to the invention.

Depending on the respective operation of the comminuting apparatus according to the invention the establishment of withdrawal of the ram device in the apparatus according to the invention for increasing a spacing of the ram device relative to the comminuting rotor can also be desirable, in particular for re-filling the comminuting chamber. In that respect it can advantageously be provided that an entrainment element like a tie anchor is arranged between the transverse member of the drive device and the ram device, in particular between the transverse member of the drive device and the coupling transverse member of the ram device. Such a tie anchor can for example include one or more entrainment bolts for movement of the ram device away from the comminuting rotor by suitable actuation of the drive device of the feed device, wherein a predetermined free play can be established between the transverse member of the drive device and the ram device. The term free play means in that respect that the transverse member of the drive device can be moved away from the ram device as far as a predetermined threshold distance before entrainment of the rani device takes place.

Desirably the entrainment element can be so arranged between the transverse member of the drive device and the rain device that it allows a movement towards each other and blocks a relative movement away from each other when a predetermined spacing is attained.

In an advantageous embodiment it can be provided that the resilient damping device is fixed under a preload between the transverse member of the drive device and the ram device, in particular between the transverse member of the drive device and the coupling transverse member of the ram device. Preferably it can be provided in that case that the fixing is such that in a movement of the transverse member of the drive device in the direction towards the comminuting rotor or the ram device further compression of the resilient damping device can occur while upon the occurrence of an opposite movement of the transverse member of the drive device relative to the comminuting rotor or the ram device no relative movement takes place between the transverse member of the drive device and the ram device, under some circumstances to avoid unacceptable tensile loadings on the resilient damping device.

Depending on the respective design configuration the resilient damping device can be of a differing design, for example in the manner of a compression spring, for example a coil compression spring or a leaf spring. In a particularly desirable embodiment the resilient damping device can have one or more elastomer bodies, in particular pot-like or cylindrical elastomer bodies. In that case it can be provided that the elastomer body or bodies are fixed in terminal relationship at the transverse member of the drive device or an intermediate plate and/or the ram device, in particular a coupling transverse member of the ram device, in such a way that they allow compression of the elastomer body or bodies in the movement of the transverse member of the drive device in the direction towards the comminuting rotor, but upon a movement of the transverse member of the drive device in the opposite direction, the arrangement prevents a predetermined pulling force acting on the elastomer body or bodies to avoid damage to the elastomer body or bodies.

To compensate for alignment errors which are possibly present between the at least two actuators perpendicularly to the direction of movement of the ram device it can desirably be provided that the transverse member of the drive device is of a telescopic configuration in its longitudinal direction, including at least two transverse elements which can be fitted into each other and which are substantially freely moveable in the longitudinal extent of the assembled transverse members relative to each other. In particular it can be provided that the transverse member is of a three-part structure comprising a central element and two end elements which are respectively arranged displaceably at the ends telescopically relative to the central portion in the longitudinal direction of the transverse member to provide the described compensation of alignment errors between the two actuators approximately perpendicularly to the direction of movement of the ram device. In a similar fashion, to compensate for alignment errors in respect of the at least two actuators in the direction of movement of the transverse member of the drive device it can be provided that there are suitable floating mountings for the actuators for mounting thereof to the machine frame of the comminuting apparatus according to the invention, which within predetermined limits permit mutual displacement of the actuators relative to each other, in particular parallel to the drive direction of the ram device.

An alignment error between the at least two actuators in relation to a perpendicular direction relative to a plane which is defined by the direction of movement of the ram device and the longitudinal extent of the comminuting rotor can be achieved by a slot guide means of the above-mentioned tie anchor or entrainment bolt, wherein said slot guide means can be arranged in particular at the transverse member of the drive device.

The at least two electric actuators of the drive device of the feed device can be fixed to the machine frame for torque support. Preferably the at least two electric actuators can be respectively mounted at an outside of the machine frame so that direct contact with the comminution stock can be avoided. By way of example a respective one of the electric actuators can be arranged at the outside of a side wall defining the receiving portion or comminuting chamber of the comminuting apparatus. Preferably it can be provided in that respect that a respective end at the motor side of an in particular elongate actuator respectively faces towards the comminuting rotor so that the actuators can be fixed in pulling relationship towards the comminuting rotor in the main load direction.

The particular configuration of the at least two electric actuators can be specifically adapted to the comminution stock. It has been found however that for usual comminution stocks such an electric actuator can respectively have an electric motor with downstream-connected reduction gear which at the output side can preferably be connected to a worm gear, wherein the worm gear can be connected at the drive output side to the transverse member of the drive device. Preferably both electric actuators can be of the same structural configuration, wherein the worm gear can include a ball screw spindle for minimizing frictional losses within the drives. By way of example a planetary gear can be adopted as the reduction gear, which permits the actuator to be of a particularly compact structure. It is however also in accordance with the invention for the at least two electric actuators to be designed without reduction gears in such a way that the shaft of the electric motor directly drives the worm gear. The purely electromechanical structure of such an actuator is protected against inadmissible shock loadings in all described embodiments, in particular by the described resilient damping device, wherein the resilient damping device can be arranged in force-transmitting and/or torque-transmitting relationship between the transverse member of the drive device and the ram device.

When using a respective ball screw drive for the at least two electric actuators it can desirably be provided that a respective recirculating ball nut is arranged or fixed at an associated longitudinal end portion of the transverse member of the drive device so that the recirculating ball nut with the transverse member of the drive device that is fixed thereto moves upon a rotation of the respective screw spindle which can be mounted to the machine frame. In that respect the end of a respective electric actuator, that faces away from the motor, can be fixed by way of a floating mounting to the machine frame, with a restricted mobility parallel to the direction of movement of the ram device for compensating for possible alignment errors in the production and/or arrangement of the at least two electric actuators on the machine frame or in operation of the comminuting apparatus according to the invention.

Preferably in the comminuting apparatus according to the invention control of the drive device of the feed device can be effected in dependence on the torque of the drive of the comminuting rotor. For that purpose there can be provided a central control device which controls both the drive of the feed device and also the drive of the comminuting rotor in dependence on the respective operating situations. In particular the control means can be adapted to avoid overloading or jamming of the comminuting rotor.

As already set forth hereinbefore the resilient damping device arranged between the transverse member of the drive device of the feed device and the ram device can be arranged and adapted to receive energy for moving the ram device in the direction towards the comminuting rotor in a first operating situation by elastic deformation, in particular to provide a pressing force on the ram device with the actuators stationary, without the electric motors of the at least two actuators necessarily having to be powered. That procedure can be desirable for example in operating situations in which the comminuting rotor operates in the region of an overload threshold. In that case the drive of the feed device can remain switched off as a necessary pressing pressure in respect of the comminution stock by way of the ram device in the direction of the comminuting rotor is afforded by the energy stored in the resilient damping device. In a corresponding fashion, in another operating situation, the resilient damping device can be arranged and adapted as described hereinbefore to liberate stored energy by virtue of elastic deformation or restoration, in particular to move the ram device in the direction towards the comminuting rotor. The energy which can be stored and restored by the resilient damping device permits in that respect improved functionality in operation of the comminuting apparatus according to the invention.

To produce synchronous movement of the transverse member of the drive device by the at least two actuators it can desirably be provided that a control means of the comminuting apparatus is adapted to implement position measurements at both actuators in order to actuate the respective electric motors for the desired synchronous drive. That position measurement can be integrated in the motor control of the electric actuators, for example by the electric motors of the electric actuators being in the form of servo motors having sensors for determining position.

Desirably it can also be provided in an embodiment that the control means is adapted to trigger a mechanical braking device for fixing the ram device when a predetermined load moment is attained. That procedure is advantageous in particular in those operating situations in which the feed of the drive device has to be stopped as the comminuting rotor is operating at a load limit and/or a load moment threshold in respect of the drive of the feed device is reached.

BRIEF DESCRIPTION OF THE DRAWINGS

The invention is described hereinafter by the description of an embodiment together with modifications with reference to the accompanying drawings in which.

DETAILED DESCRIPTION

Figure 1:
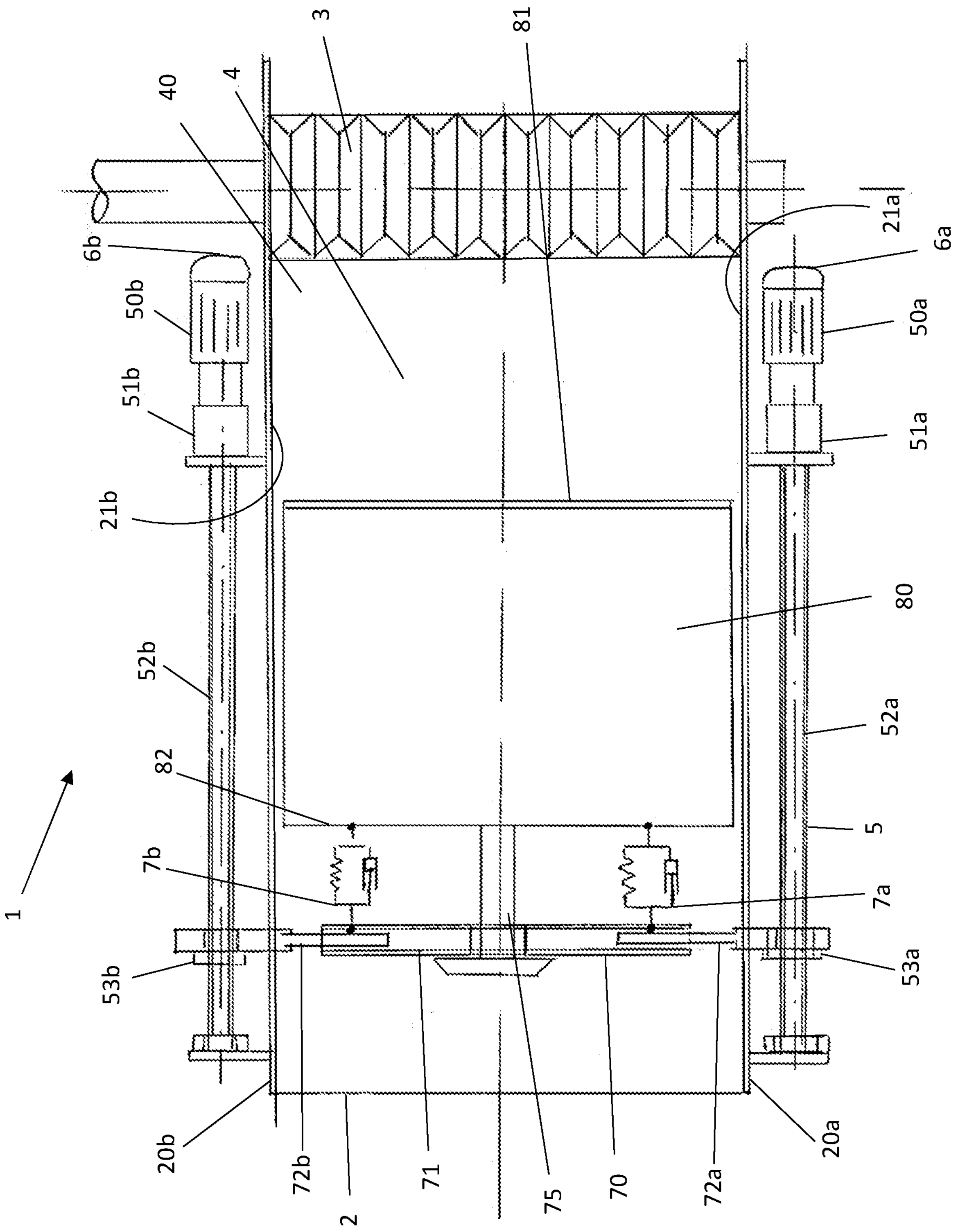
FIG. 1 is a view showing the principle of a comminuting apparatus according to the invention.

FIG. 1 shows a view illustrating the principle of a comminuting apparatus 1 designed according to the invention. In the described embodiment the comminuting apparatus 1 is designed for comminuting household waste and has an approximately rectangular machine frame 2 having two side plates 20*a*, 20*b* between which a comminuting rotor 3 is held rotatably by way of bearings (not shown). Over its working width at its periphery the comminuting rotor 3 has a plurality of comminuting tools (not shown). In that arrangement a floor plate 40 and inside surfaces 21*a, b* of the side plates 20*a, b* form a receiving chamber or comminuting chamber 4 for the comminution stock. Beneath the comminuting rotor 3 the machine frame 2 has a drop chamber in which the material comminuted by the rotor 3 drops downwardly into a catch container (not visible in FIG. 1). In operation comminution stock is introduced into the receiving chamber 4 and, for example by virtue of a predetermined inclination of the floor plate 40, can slip in the direction towards the comminuting rotor 3 at which it is comminuted in known fashion, possibly in cooperation with counterpart blades fixedly mounted to the frame. The drive of the comminuting rotor 3 is not shown in the FIG. 1 view, for example electromotive drives fitted at the side plates 20*a, b* can be used, which are flange-mounted on the comminuting rotor.

In order to ensure that the comminution stock in the receiving or comminuting chamber 4 is processed by means of comminuting tools on the comminuting rotor 3 the comminuting apparatus 1 according to the invention has a feed device including a ram 80 which here, depending on the respective embodiment, can be of a rectangular or wedge-shaped configuration and is arranged displaceably on the floor plate 40 perpendicularly to the axis of the rotor 3. The ram 80 delimits the receiving chamber 4 in the described embodiment with a delimitation portion facing towards the comminuting rotor 3, which hereinafter is also referred to as the ram plate. In that respect the receiving chamber can be increased or reduced in size by the displacement of the ram or the pusher 80, for example to prepare for refilling of the receiving chamber or for pushing the comminution stock in the direction of the comminuting rotor 3.

To drive the ram 80 the feed device in the described embodiment has two actuators of the same structural configuration, arranged at a respective side plate 20*a, b* of the machine frame 2. They each include an electric motor 50*a, b*, the motor shaft of which drives a reduction gear which is in the form of a planetary gear 51*a, b* and which at the drive output side is connected to a ball screw spindle 52*a, b* on which a recirculating ball nut 53*a, b* is displaceably arranged. Both actuators designed as described are connected at the drive output side, that is to say here at their respective recirculating ball nut 53*a, b* by means of a transverse member 70 extending parallel to the longitudinal axis of the rotor. A mechanical coupling between the transverse member 70 and the ram 80 is effected by a plurality of d resilient damping devices 7*a, b* which are only symbolically illustrated in FIG. 1.

Figure 2:
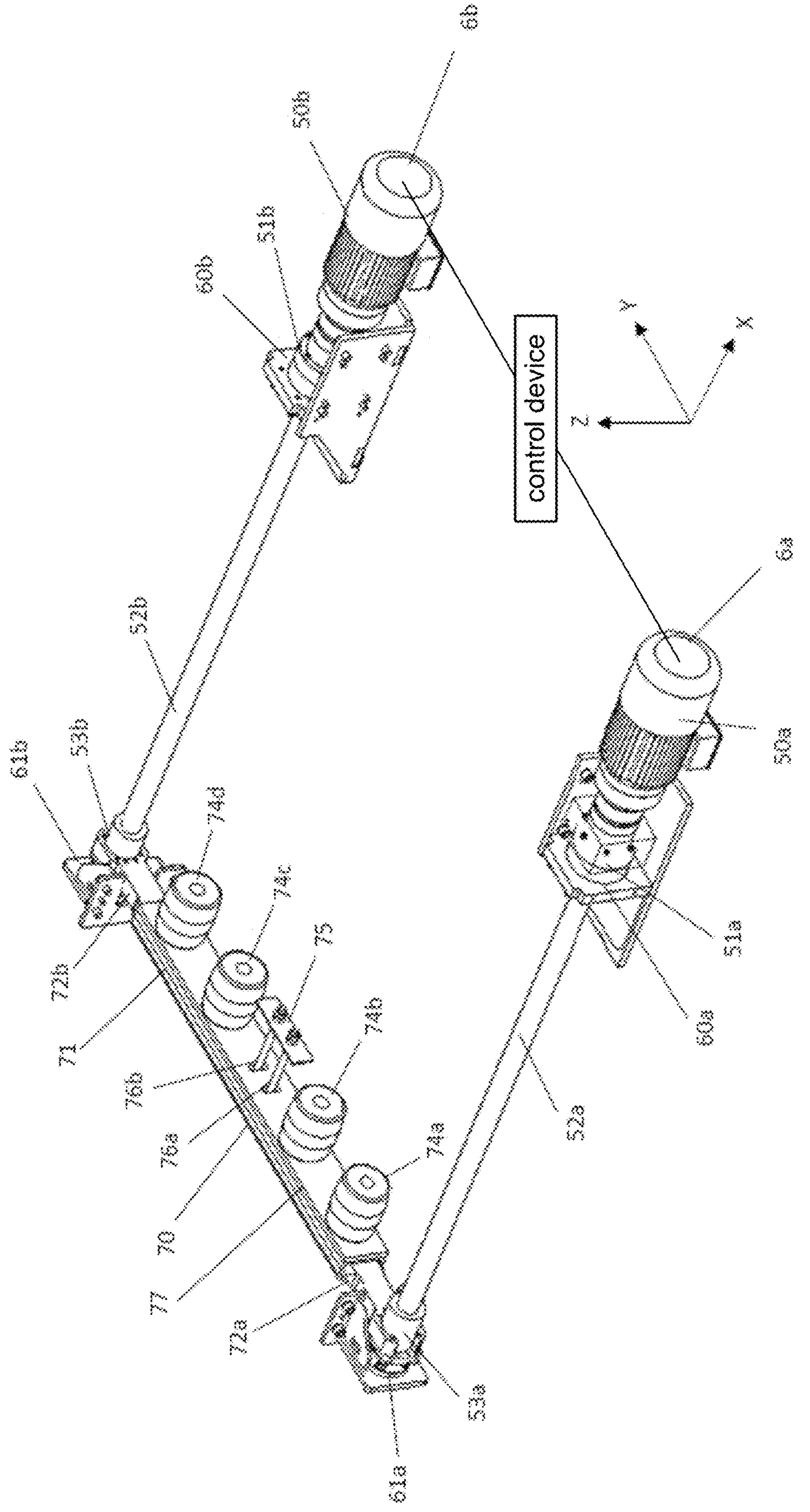
FIG. 2 shows a perspective view of the drive of a feed device for the comminuting apparatus of FIG. 1 as an overall view.

The described drive portion of the feed device 5 is shown in detail and on its own in FIG. 2 for the sake of clarity of the illustration. As can be seen from the Figure the transverse member 70 which connects the two electric actuators together at the drive output side is arranged approximately perpendicularly to the ball screw spindles 52*a, b* and in that respect in the described embodiment parallel to the rotor axis, see FIG. 1. In the described embodiment the transverse member 70 is of a three-part structure having a hollow central part 71 and two side parts 72*a, b* which can be fitted into the hollow central part. The two side parts 72*a, b* are fitted telescopically into the hollow central part 71 and are arranged displaceably in the direction relative to the rotor axis to provide for compensation of possible alignment errors in the parts relative to each other, in particular also during operation. Fixed to the central part 71 of the transverse member 70 or an associated intermediate plate 77 at the inward side are a plurality of barrel-shaped elastomer bodies 74_a, b_ which extend in the transverse direction of the transverse member and which are spaced in the longitudinal direction relative to the transverse member and which together provide a resilient damping device within the path of the force of the feed device 5 from the transverse member 70 of the drive device to the ram device 80. In addition arranged at the transverse member 70 is a tie anchor 75 which here includes two entrainment bolts and which is operative in a manner still to be described for the transmission of force between the transverse member 70 and the ram 80. FIG. 2 also shows the two mountings 60_a, b_ and 61_a, b_ for the two actuators, wherein the mountings 60_a, b_ near the motor are arranged or are in the form of fixed mountings and the mountings 61_a, b_ remote from the motor are arranged or are in the form of floating mountings with a possibility of movement in the movement direction (X-direction) of the pusher 80.

Figure 3:
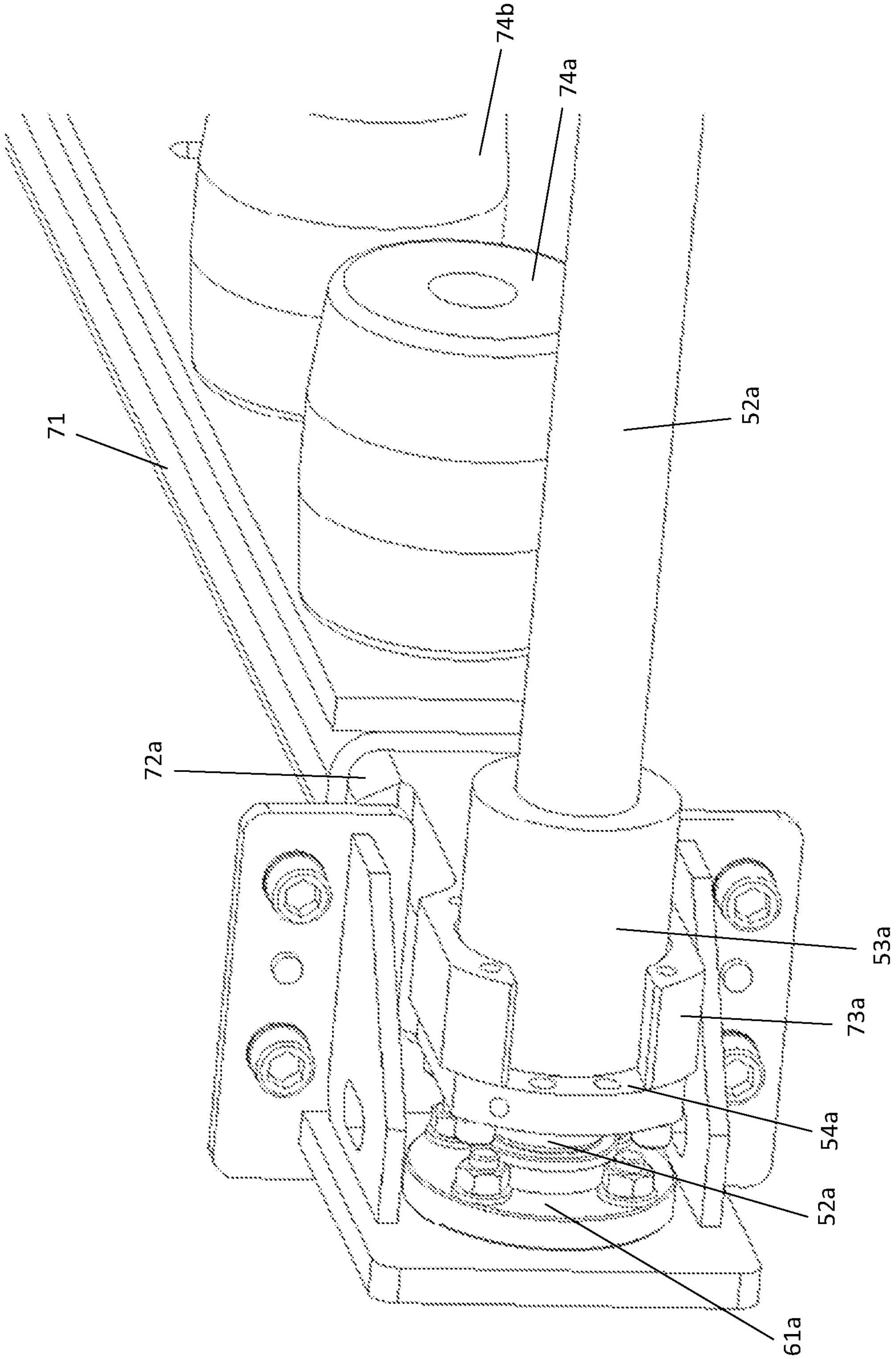
FIG. 3 shows a partial view of FIG. 2 on an enlarged scale.

FIG. 3 shows the detail of the coupling of the transverse member 70 to the actuators shown at the left in FIG. 2 on an enlarged scale. It is possible to see the central part 71 of the transverse member, into which the side part 72_a_ is inserted, which includes at the end portion a fork mounting 73_a_ adapted to embrace the outer peripheral surface, which here is cylindrical, of the recirculating ball nut 53_a_. It has a radial flange Ma which faces towards the floating mounting 61_a_ and by way of which the arms of the fork mounting 73_a_ are screwed to the recirculating ball nut 53_a_ for entrainment of the transverse member 70 in the movement of the recirculating ball nut on the associated ball screw spindle 52_a_. As can further be seen from FIG. 3 the fork arms of the fork mounting 73_a_ bear laterally against the flange Ma of the recirculating ball nut to provide for optimum load transfer in the high-load direction, that is to say in the movement of the recirculating ball nut 53_a_ in the direction of the comminuting rotor. In contrast load transfer in the movement of the recirculating ball nut 53_a_ in the opposite direction is effected solely by way of the connecting bolts between the fork arms of the side part 72_a_ and the flange Ma. The coupling of the second actuator (this is not shown in FIG. 3) is implemented in the same fashion.

To illustrate the coupling of the transverse member 70 of the drive device to the pusher 80 reference is made hereinafter to FIGS. 1 and 2. The pusher or ram 80 in the described embodiment is for example of a wedge-shaped configuration with a ram plate 81 which faces towards the rotor and a coupling plate or coupling transverse member 82 facing the transverse member 70 of the drive device. That coupling plate or coupling transverse member 82 delimits the pusher rearwardly in the direction towards the transverse member 70 of the drive device and acts as an abutment surface for the ends of the elastomer bodies 74_a-d_, that are towards the rotor, see FIG. 2. At the bottom side the pusher 80 has a plurality of running wheels (not visible) which are supported on an associated rail or the floor plate 40 of the receiving chamber. As can be seen in particular from FIG. 2 the pusher 80 is positively guided by the side plates 20_a, b_ in a direction perpendicular to the rotor axis. The ends of the elastomer bodies 74_a-d_, facing away from the rotor, can be connected to the transverse member 70 directly or indirectly by way of an intermediate plate 77 as in the described embodiment, for example by means of a material-bonding connection by adhesive or vulcanization. In the described embodiment the elastomer bodies 74_a-d_ are not connected to the coupling plate 82, see FIG. 1, but depending on the respective operating situation can be arranged in spaced relationship with the coupling plate, in particular upon withdrawal of the pusher away from the comminuting rotor 3 or can bear against the coupling plate 82, in particular in the movement of the pusher 80 in the direction of the comminuting rotor.

To withdraw the pusher away from the comminuting rotor there is a tie anchor 75 which in the described embodiment includes the two entrainment bolts 76_a, b_ which extend parallel to the direction of movement of the pusher 80 and which are supported at the rear side of the transverse member 70 of the drive device and at the rear side of the coupling plate 82. The tie anchor 75 disposed between the transverse member 70 and the pusher 80 is of such a configuration that, in a movement of the pusher in a direction away from the comminuting rotor, the elastomer bodies 74_a-d_ experience just no tensile forces while they allow an approaching movement of the transverse member 70 in the direction of the pusher 80. Accordingly in a movement of the transverse member 70 in the direction towards the rotor or pusher 80 the ends of the elastomer bodies 74_a-d_, that are towards the rotor, come into contact with the coupling plate 82 of the pusher 80 and thereupon compress the elastomer bodies in dependence on the interaction of the ram plate 81 with the comminution stock in the receiving chamber and thus elastic energy can be stored in the elastomer bodies. Depending on the respective operating situation that energy ca be used for example to maintain a pressing pressure on the comminution stock for example when the drive is switched off or to liberate the stored energy for movement of the pusher and therewith the comminution stock in the direction towards the rotor.

In an embodiment which is not shown here it can also be provided that the entrainment bolts can be adjusted in respect of their length in such a way that the elastomer bodies 74_a-d_ are preloaded in any operating situation, for example to set a given characteristic curve for the elastomer bodies. In this embodiment also the tie anchor acts in particular upon withdrawal of the pusher for transmitting the movement of the transverse member 70 to the pusher to avoid a tensile loading on the elastomer bodies.

In a further embodiment which is not shown here it can also be provided that one or more steel springs are arranged between the transverse member 70 of the drive device and the coupling plate 82 of the ram or the pusher 80, wherein those steel springs are again fixed to one of the parts being the transverse member or the intermediate element or coupling plate while they are fixed at the other end. In this embodiment too a tie anchor which may be of an identical structural configuration as in the above-described embodiment serves to avoid tensile forces which may possibly act destructively on the damping element.

LIST OF REFERENCES

1 comminuting apparatus
2 machine frame
3 comminuting rotor
4 receiving/comminuting chamber
5 feed device
6_a, b_ electric actuator
7_a, b_ resilient damping device
20_a, b_ side plate
21_a, b_ inside surface
22_a, b_ support flange
30 comminuting tool
40 floor plate, floor portion
50_a, b_ electric motor
51_a, b_ planetary gear
52_a, b_ ball screw spindle, screw spindle
53_a, b_ recirculating ball nut

54*a, b* flange
60*a, b* fixed mounting
61*a, b* floating mounting
70 transverse member
71 central element
72*a, b* side element
73*a, b* fork mounting
74*a-d* elastomer body
75 tie anchor
76*a, b* entrainment bolt
77 intermediate plate
80 ram, pusher, ram device
81 ram plate, ram element
82 coupling plate, associated transverse member

What is claimed is:

1. A comminuting apparatus to comminute comminution stock, the comminuting apparatus comprising:

a comminuting rotor mounted rotatably to a machine frame and having comminuting tools arranged thereon, a receiving region to receive comminution stock, a feed device having a ram device which is moveable in a direction towards the comminuting rotor by a drive device and which is configured to feed comminution stock to the comminuting rotor, wherein the drive device of the feed device has at least two spaced electric actuators which are controlled by a control device and which are connected at a drive output side by a transverse member, wherein the transverse member is operatively connected to the ram device by a resilient damping device configured to store energy by elastic deformation and to apply the stored energy to the ram device in the direction towards the comminuting rotor, and wherein the resilient damping device includes at least one elastomer body.

2. The comminuting apparatus as set forth in claim 1, wherein the ram device is arranged moveably on a floor portion delimiting the receiving region and is supported by the floor portion.

3. The comminuting apparatus as set forth in claim 2, wherein the ram device is rollably supported on the floor portion.

4. The comminuting apparatus as set forth in claim 1, wherein the transverse member, the resilient damping device and the ram device are coupled together such that the operative connection of the transverse member and the ram device implemented by the resilient damping device, is provided in a movement of the ram device in the direction towards the comminuting rotor and is removed in a movement of the ram device in an opposite direction.

5. The comminuting apparatus as set forth in claim 1, wherein the transverse member of the drive device is coupled by the resilient damping device to an associated transverse member of the ram device, wherein the resilient damping device is supported at both the transverse member and the associated transverse member in at least one relative operative position of the two transverse members relative to each other.

6. The comminuting apparatus as set forth in claim 1, wherein arranged between the transverse member of the drive device and the ram device is a tie anchor for a movement of the ram device away from the comminuting rotor by the drive device of the feed device.

7. The comminuting apparatus as set forth in claim 6, wherein a predetermined free play is provided between the transverse member of the drive device and the ram device.

8. The comminuting apparatus as set forth in claim 6, wherein the tie anchor is arranged between the transverse member of the drive device and an associated transverse member of the ram device.

9. The comminuting apparatus as set forth in claim 1, wherein the resilient damping device is fixed under a preload between the transverse member of the drive device and an associated transverse member of the ram device.

10. The comminuting apparatus as set forth in claim 1, wherein at least the transverse member of the drive device is of a telescopic structure including at least two transverse elements fitted into each other and which are freely moveable relative to each other in a longitudinal extent of the transverse member for compensation of alignment errors between the at least two actuators.

11. The comminuting apparatus as set forth in claim 1, wherein the at least two electric actuators are spaced relative to each other in parallel relationship with a longitudinal direction of the comminuting rotor and are arranged outside the receiving region and are fixed to the machine frame.

12. The comminuting apparatus as set forth in claim 1, wherein the at least two electric actuators respectively have an electric motor with downstream-connected reduction gear which is connected at an output side to a worm gear which worm gear is connected at an output side to the transverse member.

13. The comminuting apparatus as set forth in claim 12, wherein the respective reduction gear is in a form of a planetary gear connected at the output side to a ball screw drive, wherein a respective recirculating ball nut is fixed at an associated end portion of the transverse member of the drive device and a respective screw spindle is mounted to the machine frame.

14. The comminuting apparatus as set forth in claim 1, wherein the control device is configured to actuate in load-dependent relationship respective electric motors of the actuators in dependence on a torque load of the drive of the comminuting rotor.

15. The comminuting apparatus as set forth in claim 1, wherein the resilient damping device is configured to receive energy for movement of the ram device in the direction towards the comminuting rotor in a first operating situation by elastic deformation for providing a pressing force on the ram device with the actuators stationary.

16. The comminuting apparatus as set forth in claim 1, wherein the resilient damping device is configured to convert energy stored by elastic deformation by movement of the ram device in the direction towards the comminuting rotor in a second operative position.

17. The comminuting apparatus as set forth in claim 1, wherein the control device is configured to carry out position measurements in respect of both actuators for such actuation of a respective electric motor of the actuators that the transverse member of the drive device is moved synchronously by both actuators.

18. The comminuting apparatus as set forth in claim 1, wherein the control device is configured, upon attainment of a predetermined load moment, to actuate respective electric motors of the actuators to provide a motor moment corresponding to the predetermined load moment or to apply a trigger to fix the ram device.

19. A comminuting apparatus to comminute comminution stock, the comminuting apparatus comprising:

a comminuting rotor mounted rotatably to a machine frame and having comminuting tools arranged thereon, a receiving region to receive comminution stock, a feed device having a ram device which is moveable in a direction towards the comminuting rotor by a drive device and which is configured to feed comminution stock to the comminuting rotor, wherein the drive device of the feed device has at least two spaced electric actuators which are controlled by a control device and which are connected at a drive output side by a transverse member, wherein the transverse member is operatively connected to the ram device by a resilient damping device configured to store energy by elastic deformation and to apply the stored energy to the ram device in the direction towards the comminuting rotor, and wherein the resilient damping device is configured to receive energy for movement of the ram device in the direction towards the comminuting rotor in a first operating situation by elastic deformation for providing a pressing force on the ram device with the actuators stationary.

20. A comminuting apparatus to comminute comminution stock, the comminuting apparatus comprising:

a comminuting rotor mounted rotatably to a machine frame and having comminuting tools arranged thereon, a receiving region to receive comminution stock, a feed device having a ram device which is moveable in a direction towards the comminuting rotor by a drive device and which is configured to feed comminution stock to the comminuting rotor, wherein the drive device of the feed device has at least two spaced electric actuators which are controlled by a control device and which are connected at a drive output side by a transverse member, wherein the transverse member is operatively connected to the ram device by a resilient damping device configured to store energy by elastic deformation and to apply the stored energy to the ram device in the direction towards the comminuting rotor, and wherein the resilient damping device is configured to convert energy stored by elastic deformation by movement of the ram device in the direction towards the comminuting rotor in a second operative position.

* * * * *